(12) United States Patent
Sakamoto et al.

(10) Patent No.: US 8,036,532 B2
(45) Date of Patent: Oct. 11, 2011

(54) PASSIVE OPTICAL NETWORK SYSTEM, OPTICAL LINE TERMINAL, AND OPTICAL NETWORK UNIT

(75) Inventors: Kenichi Sakamoto, Kokubunji (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/780,364

(22) Filed: May 14, 2010

(65) Prior Publication Data

US 2010/0221007 A1 Sep. 2, 2010

Related U.S. Application Data

(63) Continuation of application No. 11/778,247, filed on Jul. 16, 2007, now Pat. No. 7,734,178.

(30) Foreign Application Priority Data

Dec. 8, 2006 (JP) .................................. 2006-331671

(51) Int. Cl.
*H04J 14/00* (2006.01)
(52) U.S. Cl. ............... 398/67; 398/68; 398/71; 398/72
(58) Field of Classification Search .............. 398/58, 398/66–72, 165, 166
See application file for complete search history.

(56) References Cited

U.S. PATENT DOCUMENTS

| | | | | |
|---|---|---|---|---|
| 5,930,014 A * | 7/1999 | Yamamoto | ...................... | 398/58 |
| 6,097,736 A | 8/2000 | Proctor et al. | | |
| 6,385,206 B1 * | 5/2002 | Nakata | ........................... | 370/407 |
| 6,798,781 B1 * | 9/2004 | Hill | ................................ | 370/398 |
| 7,734,178 B2 * | 6/2010 | Sakamoto et al. | ............... | 398/67 |
| 2004/0184806 A1 | 9/2004 | Lee et al. | | |
| 2005/0172328 A1 | 8/2005 | Park et al. | | |
| 2007/0147835 A1 | 6/2007 | Kim et al. | | |

FOREIGN PATENT DOCUMENTS

| | | |
|---|---|---|
| JP | 07-007523 A | 1/1995 |
| JP | 2003-188832 A | 7/2003 |
| JP | 2004-135240 A | 4/2004 |
| JP | 2005-045541 A | 2/2005 |
| JP | 2006-157847 A | 6/2006 |

OTHER PUBLICATIONS

International Telecommunications Union, ITU-T, G.984.3, Feb. 2004, Series G: Transmission Systems and Media, Digital Systems and Networks.

* cited by examiner

*Primary Examiner* — Dalzid Singh
(74) *Attorney, Agent, or Firm* — Mattingly & Malur, PC

(57) ABSTRACT

In a PON system by WDM, IP broadcast can be received without oppressing a band used by a user for Internet communication. An OLT provides a first wavelength received in common by respective ONUs and plural second wavelengths by which the OLT and the respective ONUs perform communication individually. With respect to signals in the downstream direction, each of the OLTs includes a transmitter to transmit the first wavelength and plural transmitters to transmit the second wavelengths used for the individual communication with the respective ONUs. Each of the ONUs includes a receiver to receive the first wavelength and a receiver to receive the second wavelength used in the ONU itself. The OLT transmits data of the IP broadcast by the first wavelength and transmits individual data of each of the ONUs by the second wavelength corresponding to the ONU.

25 Claims, 17 Drawing Sheets

750

| NUMBER | DOWNSTREAM WAVELENGTH NUMBER | ONU NUMBER | ONU INDIVIDUAL NUMBER |
|---|---|---|---|
| 1 | 0 | COMMON | |
| 2 | 1 | 2 | A, B, C, D |
| 3 | 2 | 4 | C, D, A, B |
| .. | .. | | |
| n+1 | n | NON-ASSIGN | |

WAVELENGTH MANAGEMENT TABLE (DOWNSTREAM) IN OLT WAVELENGTH CONTROL BLOCK

| NUMBER | UPSTREAM WAVELENGTH NUMBER | ONU NUMBER | ONU INDIVIDUAL NUMBER |
|---|---|---|---|
| 1 | 1 | 2 | A, B, C, D |
| 2 | 2 | 4 | C, D, A, B |
| 3 | 3 | | |
| .. | .. | | |
| n | n | NON-ASSIGN | |

WAVELENGTH MANAGEMENT TABLE (UPSTREAM) IN OLT WAVELENGTH CONTROL BLOCK

FIG.10

| VLAN ID | IP ADDRESS | OUTPUT PATH | DOWNSTREAM WAVELENGTH NUMBER |
|---|---|---|---|
| A | a. b. c. d | COMMON | 0 |
| B | c. d. e. f | 2 | 1 |
| B | e. f. g. h | 4 | 2 |
| .. | .. | .. | .. |

OLT ROUTING TABLE (DOWNSTREAM)

FIG.11

PASSIVE OPTICAL NETWORK SYSTEM, OPTICAL LINE TERMINAL, AND OPTICAL NETWORK UNIT

This is a continuation application of U.S. application Ser. No. 11/778,247, filed Jul. 16, 2007, now allowed, the contents of which are hereby incorporated by reference into this application.

CLAIM OF PRIORITY

The present application claims priority from Japanese application JP 2006-331671 filed on Dec. 8, 2006, the content of which is hereby incorporated by reference into this application.

BACKGROUND OF THE INVENTION

1. Field of the Invention

The present invention relates to a passive optical network system, an optical line terminal and an optical network unit, and particularly to a passive optical network system in which communication is performed by wavelength division multiplexing in an access network using an optical technique or an optical access system using a PON (Passive Optical network) system, an optical line terminal and an optical network unit.

2. Description of Related Art

In recent years, as the Internet becomes widespread, user's methods of using the Internet are diversified. In addition to mail and WEB access, file download by Peer to Peer (P2P) and viewing of movies on the network become general, and from now, broadcast is expected to be performed through the Internet. With this, a demand for speed-up of the network is raised, and Asymmetric Digital Subscriber line (ADSL), Broadband PON (B-PON), Gigabit Ethernet PON (GE-PON) (Ethernet is a registered trademark), or Gigabit Capable PON (G-PON) comes into wide use. Especially, in the PON system, when a local switch (OLT: Optical Line Terminal) installed in a station and a network unit (ONU: Optical Network Unit) installed in each user's house are connected to each other, one fiber is taken out from the OLT and is branched using an optical splitter to connect each user. Thus, the cost of laying the fiber is low, and high-speed communication can be performed since the optical transmission is used, and therefore, the PON system has become widespread in various countries in the world.

Optical transmission systems includes Time Division Multiplexing (TDM), Wavelength Division Multiplexing (WDM), Code Division Multiplexing (CDM) and the like. The B-PON, GE-PON, or G-PON is a system which uses different wavelengths in upstream and downstream and in which with respect to communication between the local switch (OLT: Optical Line Terminal) installed in the station and the network unit (ONU: Optical Network Unit) installed in each user, the communication of signals is performed by time division (TDM) in which signal communication time is assigned to each ONU.

In addition to the optical access system, a further high-speed PON system has been considered. As an approach to speed-up, a system of further increasing communication frequency in the TDM system, a system of increasing the speed by the CDM, or the like has been considered, and as another effective system, a speed-up system by the WDM has been considered.

In the WDM system, the OLT and the ONUs are connected through waves of plural different wavelengths in both an upstream signal and a downstream signal, and each of the ONUs receives and transmits a specific wavelength so that the communication is performed. The individual wavelength is assigned to each ONU from the OLT and the communication is performed, so that a communication band can be remarkably improved, and therefore, the WDM system is expected as a next generation optical access system.

Besides, there is disclosed an example of initial setting of a path on the B-PON system (see, for example, U.S. Pat. No. 6,097,736). Further, there is disclosed a system in which communication between the OLT and the ONUs is performed by the TDM in which signal communication time is assigned to each of the ONUs (see, for example, ITU-T Recommendation G.984.3).

In the WDM system, as described above, the communication band can be improved. On the other hand, one of future applications in the Internet is Internet broadcast. The feature of the broadcast is that the same information is simultaneously distributed to the respective ONUs, and viewing is performed by an IP function-supporting TV or a personal computer connected to each of the ONUs.

In the PON of the WDM system, in the case where a broadcast is delivered from the OLT to the ONUs, since the wavelengths of lights received by the respective ONUs are different from each other, it is necessary that the OLT copies and transmits the broadcast signal for the respective waves.

In the case where waves having the communication capacity of 1 Gbps are assigned to the respective ONUs one by one, for example, when the IP broadcast of 100 ch (about 10 Mbps per 1 ch) is assigned, 1 Gbps is used for the transmission of the broadcast. A band which can be used by the user for the other communication is not left. As stated above, when the IP broadcast is realized on the WDM-PON, the band is oppressed.

Further, in order to transmit the IP broadcast signal to the respective wavelengths, the OLT is required to have a function of copying the IP broadcast and multiplexing it to the respective waves, and the scale of this circuit becomes very large.

On the other hand, in the WDM-PON, each of the ONUs is requested to select a specific wavelength in order to connect with the OLT and to start the communication. When an ONU is installed, it is troublesome that an installer sets a wavelength other than those used in the OLT and the other ONUs. For convenience of the work, it is necessary that each ONU automatically negotiates with the OLT and is connected thereto. However, in the initial state, since it is difficult for the ONU to know which wavelength is to be used to perform the connection, each ONU can not perform the communication for negotiating with the OLT about which wavelength is to be used to perform the communication.

SUMMARY OF THE INVENTION

In view of the above, a first object of the invention is to provide a communication system in which in a PON system by WDM, IP broadcast can be received without oppressing a band used by a user for Internet communication.

Further, a second object of the invention is to provide a communication system in which in a PON system by WDM, each ONU negotiates with an OLT at the time of initial setting, and a wavelength which can be used by the ONU is automatically acquired.

There is provided a WDM communication system using a first wavelength which is received in common by respective ONUs from an OLT, and second wavelengths (plural) by which the OLT (Optical Line Terminal) and the respective ONUs (Optical Network Units) communicate with each other. With respect to signal communication in a downstream direction, the OLT has a function of transmitting the first wavelength and the second wavelengths (plural) used for communication with each of the ONUs, and each of the ONUs has a function of receiving the first wavelength and the second wavelength used by the ONU itself. A signal of the first wavelength is branched by a splitter and can be received by each of the ONUS.

In order to realize the first object, the OLT maps an IP broadcast signal onto the first wave and transmits it, and each of the ONUS can receive the broadcast signal by receiving the IP broadcast signal mapped on the first signal. Besides, the signal of the second wavelength to the ONU itself is used for communication of other information such as the Internet, so that the band is not oppressed by the IP broadcast signal and the communication can be performed.

In order to realize the second object, a wavelength assigned to the first wave is previously specified, the OLT uses the first wave to advertise information of an upstream wavelength which can be used when an ONU is next connected, and when an ONU is connected to the OLT, the ONU receives the advertised wavelength information and uses the wavelength of the advertised upstream signal to negotiate with the OLT about the assignment of a wavelength, the OLT receives the assign request from the ONU and assigns a wavelength for an upstream signal and a wavelength for a downstream signal to the ONU, and accordingly, the wavelength of the wave for communication is automatically determined for the ONU, and it becomes possible to determine the wavelength of the wave used by the ONU.

A WDM-PON system of the invention is such that for example, in the WDM-PON system including an OLT, an optical fiber, an optical splitter, and plural ONTs (ONUs), each of the ONTs including a wavelength control unit to variably control a transmission wavelength and a reception wavelength, the OLT includes transmission light sources the number of which is equal to a number obtained by adding one to the maximum number of connectable ONTs and wavelengths of which are different from each other, a receiver capable of simultaneously receiving all wavelengths the number of which is equal to the number of the ONTs, a table to manage assigned wavelengths for the respective ONTs, and a control message transmission and reception unit to negotiate with the ONTs about wavelength assignment, and each of the ONTs includes two receivers wavelengths of which are different from each other and one transmitter, a control message transmission and reception unit to negotiate about wavelength assignment, and a unit to store a wavelength to be set in the wavelength control unit based on a result of the negotiation by the control message.

Another WDM-PON system of the invention is such that for example, in the WDM-PON system including an OLT, an optical fiber, an optical splitter, and plural ONTs, each of the ONTs including a wavelength control unit to variably control a transmission wavelength and a reception wavelength, the OLT includes transmission light sources the number of which is equal to a number obtained by adding one to the maximum number of connectable ONTs and wavelengths of which are different from each other, a receiver capable of simultaneously receiving all wavelengths the number of which is equal to a number obtained by adding one to the number of the ONTs, a table to manage assigned wavelengths for the respective ONTs, and a control message transmission and reception unit to negotiate with the ONTs about wavelength assignment, and each of the ONTs includes two receivers wavelengths of which are different from each other and two transmitters, a control message transmission and reception unit to negotiate about wavelength assignment, and a unit to store a wavelength to be set in the wavelength control unit based on a result of the negotiation by the control message.

Another WDM-PON system of the invention is such that for example, in the WDM-PON system including an OLT, an optical fiber, an optical splitter, and plural ONTs, each of the ONTs including a wavelength control unit to variably control a transmission wavelength and a reception wavelength, the OLT includes plural transmission light sources having wavelengths different from each other, a receiver capable of simultaneously receiving signals of wavelengths the number of which is equal to the number of the ONTs, a table to manage assigned wavelengths for the respective ONTs, and a control message transmission and reception unit to negotiate with the ONTs about wavelength assignment, and each of the ONTs includes plural receivers wavelengths of which are different from each other and plural transmitters, a control message transmission and reception unit to negotiate about wavelength assignment, and a unit to store a wavelength to be set in the wavelength control unit based on a result of the negotiation by the control message.

According to the first solving means of this invention, there is provided a passive optical network system which comprises an optical line terminal, an optical splitter, an optical fiber, and a plurality of optical network units connected to the optical line terminal through the optical splitter, and in which the optical line terminal and the optical network units communicate with each other by wavelength division multiplexing, wherein a first wavelength which is received in common by the respective optical network units is previously determined, and a second wavelength for communication between the optical line terminal and each of the optical network units is assigned to each of the optical network unit among a plurality of wavelengths which are different from the first wavelength, wherein the optical line terminal includes:

a plurality of first transmitters each of which has a light source different from each other in wavelength;

a plurality of first receivers to receive signals of a plurality of wavelengths;

a wavelength management table to manage, for each of identifiers of the optical network units, second wavelength information assigned for communication with each of the optical network units; and a first control unit to transmit a control message for assigning the second wavelength to the optical network unit through one of the first transmitters, wherein each of the optical network units includes:

two or three or more second receivers in which wavelengths different from each other are set and which respectively receive signals of the set wavelengths;

one or a plurality of second transmitters to transmit signals of set wavelengths;

a wavelength control unit to variably control transmission wavelengths of the second transmitters and reception wavelengths of the second receivers in accordance with stored wavelength information; and a second control unit to receive the control message for assigning the second wavelength from the optical line terminal through the second receiver and to store the second wavelength information assigned to the optical network unit itself into the wavelength control unit, wherein one of the first transmitters of the optical line terminal and one of the second receivers of the optical network units are previously set to the first wavelength, and wherein data of broadcast communication to the optical network units is transmitted by the first wavelength, and/or the control message including second wavelength information not assigned to other communications on the basis of the wavelength management table is transmitted to the optical network unit by the first wavelength, and the second wavelength is assigned to each of the optical network units.

According to the second solving means of this invention, there is provided an optical line terminal in a passive optical network system which comprises the optical line terminal, an optical splitter, an optical fiber, and a plurality of optical network units connected to the optical line terminal through the optical splitter, and in which the optical line terminal and the optical network units communicate with each other by wavelength division multiplexing, wherein a first wavelength which is received in common by the respective optical network units is previously determined, and the optical line terminal assigns a second wavelength for communication between the optical line terminal and each of the optical network units to each of the optical network units among a plurality of wavelengths which are different from the first wavelength, wherein the optical line terminal comprises:

a plurality of transmitters each of which has a light source different from each other in wavelength;

a plurality of receivers to receive signals of a plurality of wavelengths;

a wavelength management table to manage, for each of identifiers of the optical network units, second wavelength information assigned for communication with each of the optical network units; and a control unit to transmit a control message for assigning the second wavelength to the optical network unit through one of the transmitters, wherein one of the transmitters is previously set to the first wavelength common to one of receivers of the optical network units, and wherein data of broadcast communication to the optical network units is transmitted by the first wavelength, and/or the control message including second wavelength information not assigned to other communications on the basis of the wavelength management table is transmitted to the optical network unit by the first wavelength, and the second wavelength is assigned to the optical network unit.

According to the third solving means of this invention, there is provided an optical network unit in a passive optical network system which comprises an optical line terminal, an optical splitter, an optical fiber, and a plurality of optical network units connected to the optical line terminal through the optical splitter, and in which the optical line terminal and the optical network units communicate with each other by wavelength division multiplexing, wherein a first wavelength which is received in common by the respective optical network units is previously determined, and a second wavelength for communication between the optical line terminal and the optical network unit itself is assigned among a plurality of wavelengths which are different from the first wavelength, wherein the optical network unit comprise:

two or three or more receivers in which wavelengths different from each other are set and which respectively receive signals of the set wavelengths;

one or a plurality of transmitters to transmit signals of set wavelengths;

a wavelength control unit to variably control transmission wavelengths of the transmitters and reception wavelengths of the receivers in accordance with stored wavelength information; and a control unit to receive a control message for assigning the second wavelength from the optical line terminal through the receiver and to store the second wavelength information assigned to the optical network unit itself into the wavelength control unit, wherein the first wavelength common to one of transmitters of the optical line terminal is previously set in one of the receivers, and wherein data of broadcast communication from the optical line terminal is received by the first wavelength, and/or the control message including second wavelength information not assigned to other communications is received from the optical line terminal by the first wavelength, and the second wavelength is assigned.

According to the forth solving means of this invention, there is provided a passive optical network system which comprises an optical line terminal, an optical splitter, an optical fiber, and a plurality of optical network units connected to the optical line terminal through the optical splitter, and in which the optical line terminal and the optical network units communicate with each other by wavelength division multiplexing, wherein the optical line terminal includes:

a first transmitter to transmit a signal of a previously determined first wavelength;

a plurality of second transmitters to transmit signals of a plurality of second wavelengths assigned to the respective optical network units;

a plurality of first receivers to receive signals of a plurality of third wavelengths from the respective optical network units; and a distribution unit which identifies whether a packet received from a network is a packet of broadcast communication or a packet of point-to-point communication with the optical network unit, outputs, when it is the packet of the broadcast communication, the packet to the first transmitter, and outputs, when it is the packet of the point-to-point communication with the optical network unit, the packet to the second transmitter of the second wavelength assigned to the optical network unit of the destination of the packet, wherein each of the plurality of optical network units includes:

a second receiver to receive a signal of the first wavelength;

a third receiver to receive a signal of the second wavelength assigned to the optical network unit itself; and a third transmitter to transmit a signal of the third wavelength assigned to the optical network unit itself, and wherein the packet of the broadcast communication transmitted from the first transmitter by the first wavelength is branched by the optical splitter and is received by the second receiver of each of the optical network units, and the packet of the point-to-point communication with the optical network unit transmitted from the second transmitter by the second wavelength is received by the third receiver of a desired optical network unit.

In the WDM-PON system, since the downstream wavelength used in common is prepared, even in the case where each of the ONUS receives the IP broadcast, the band is not oppressed by the IP broadcast, and the communication of other information, such as the Internet, can be performed. Further, the wavelength of the wave individually used by each of the ONUS can be automatically set by using the signal, and the operation cost can be reduced.

BRIEF DESCRIPTION OF THE DRAWINGS

FIG. 10 shows a table structural example of a wavelength management table in an OLT wavelength control block 75.

FIG. 11 shows a structural example of an OLT routing table held in the inside of an OLT transmission block 93.

DESCRIPTION OF PREFERRED EMBODIMENTS

Figure 1:
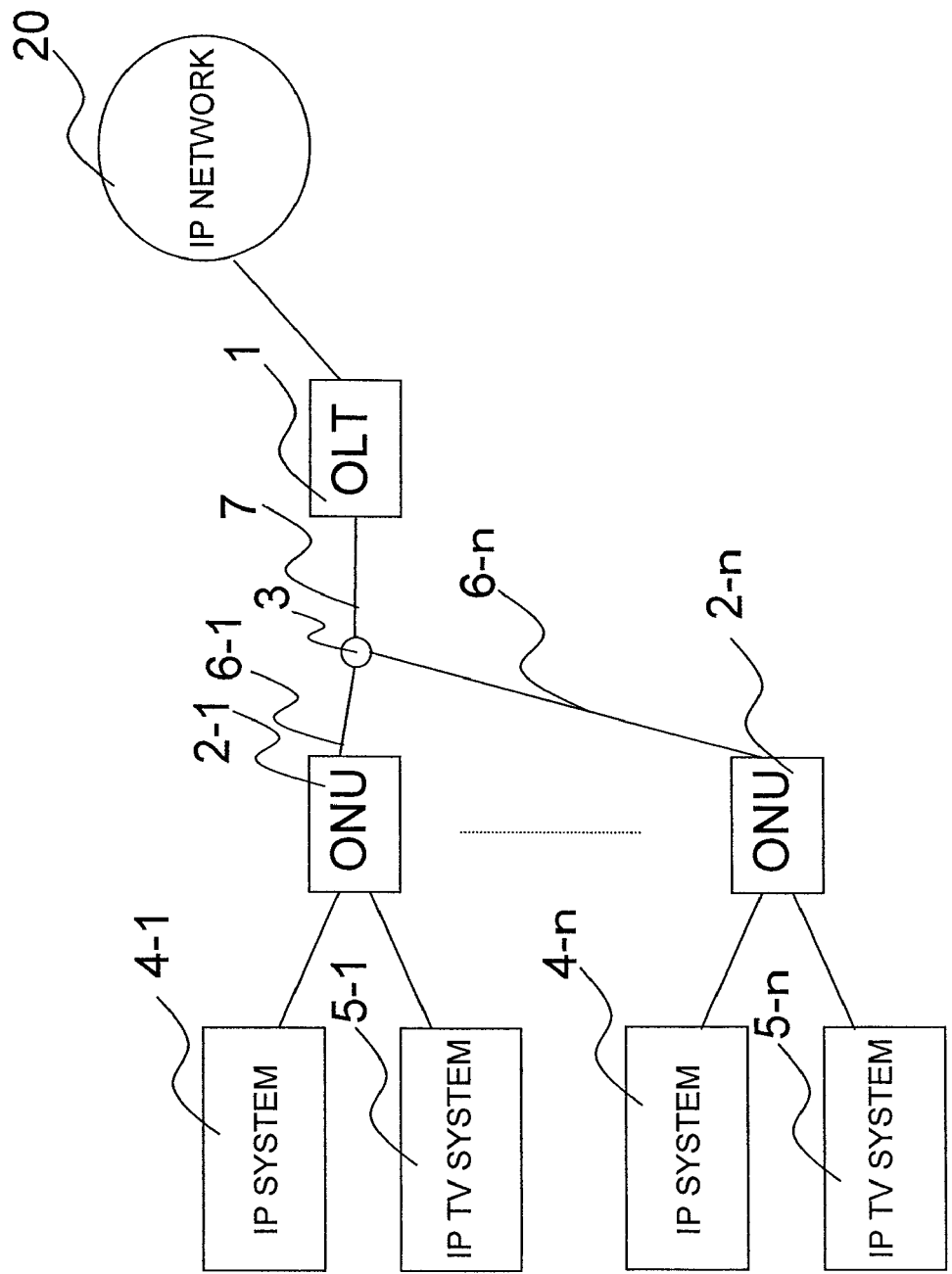
FIG. 1 is a structural view of an optical access network to which the invention is applied.

FIG. 1 shows a structural example of an optical access network system according to an embodiment.

The optical access network (PON system, passive optical network) includes an OLT 1, plural ONUS (or ONTs) 2, and a splitter 3.

The optical access network is constructed between the OLT 1 and the respective ONUS 2, and each of the ONUS 2 and the OLT 1 are connected to each other through a main line optical fiber 7, the splitter 3, and a branch line optical fiber 6-1. At least one of the ONUS 2 is connected to an IP system 4 and an IP TV system 5. Besides, the OLT is connected to an IP network 20.

Figure 2:
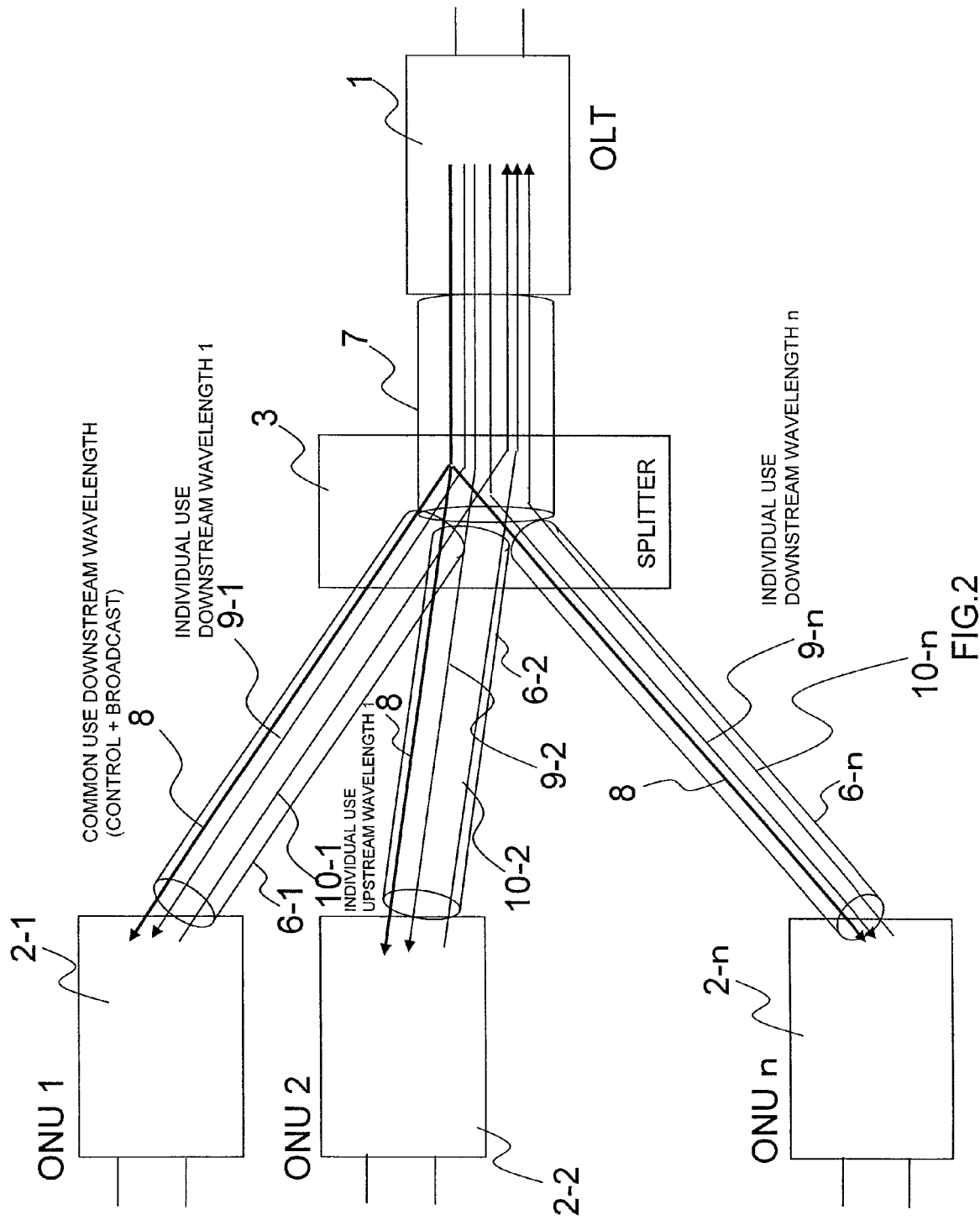
FIG. 2 shows an example of wavelength assignment of the invention.

FIG. 2 is an explanatory view of optical wavelength assignment in the optical access system according to the embodiment.

Each of the ONUS 2 and the OLT 1 are connected through the main line optical fiber 7, the splitter 3, and the branch line optical fiber 6-1. A common use downstream wavelength (first wavelength) 8, n individual use downstream wavelengths 9, and an individual use upstream wavelength 10 (upstream and downstream wavelengths are collectively called second wavelengths) are multiplexed into the main line optical fiber 7 and the branch line optical fiber 6. The common use downstream wavelength 8 transmitted from the OLT 1 is received by the respective ONUS 2. The individual use downstream wavelength 9 transmitted from the OLT 1 is received by a specific ONU (for example, the ONU 2-1 receives the wavelength 9-1). Further, the individual use upstream wavelengths 10 are transmitted from the respective ONUS (for example, the ONU 2-1 transmits the wavelength 10-1) and are received by the OLT 1.

Figure 3:
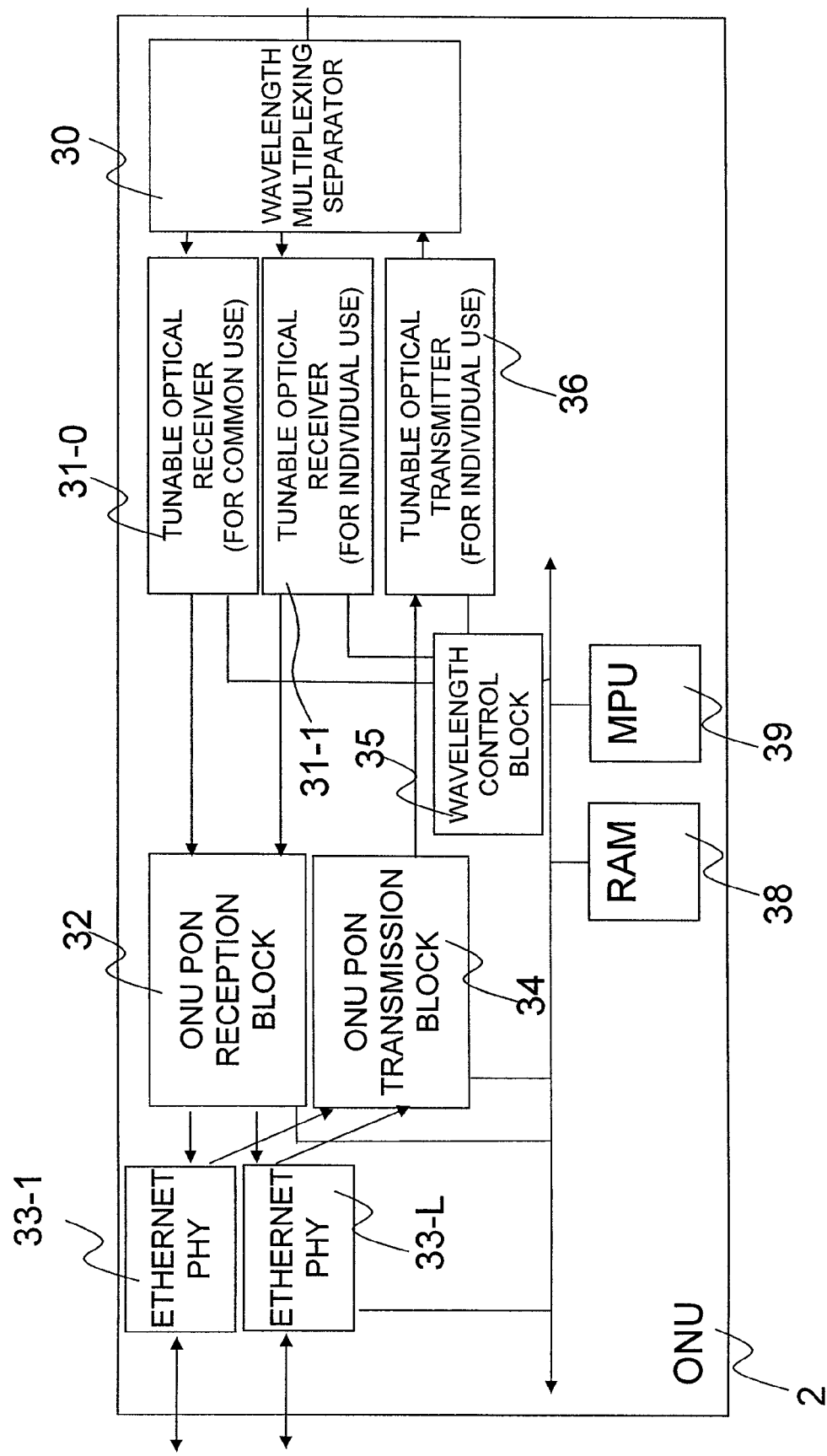
FIG. 3 shows a structural example of an ONU in a first embodiment.

FIG. 3 shows a structural example of the ONU 2 constituting the optical access system according to this embodiment.

The ONU 2 includes, for example, a wavelength multiplexing separation function 30, a tunable optical receiver 31-0 for common wavelength, a tunable optical receiver 31-1 for individual wavelength, an ONU PON reception block 32, Ethernet PHYs 33-1 to 33-L, an ONU PON transmission block 34, a tunable optical transmitter (for individual use) 36, a RAM 38, an MPU 39, and a wavelength control block (wavelength control unit) 35.

The ONU 2 includes, with respect to the downstream, a function of receiving the common use downstream wavelength 8 transmitted from the OLT 1 and the signal of the individual use downstream wavelength for the ONU 2 itself, and with respect to the upstream, a function of transmitting the individual use upstream wavelength 10 to be transmitted from the ONU 2 to the OLT 1. The ONU 2 has a function (second control unit), including the MPU 39 and the RAM 38, of controlling the ONU 2, sets the common use downstream wavelength 8 to be received by each ONU 2, the individual use downstream wavelength for the ONU 2, and the individual use upstream wavelength 10 to be transmitted into the wavelength control block 35, and sets the wavelengths into the tunable optical receivers 31-0 and 31-1 and the tunable optical transmitter 36.

With respect to the reception from the OLT 1, the incoming optical signal is separated by the wavelength multiplexing separation function 30. The common use downstream wavelength 8 is received by the tunable optical receiver (for common use) 31-0, and after photo-electric conversion, it is transferred to the ONU PON reception block 32. At this time, in the case where the common use downstream wavelength 8 is previously determined, instead of the tunable optical receiver (for common use) 31-0, an optical receiver for specific wavelength reception may be used. Besides, the individual use downstream wavelength is received by the tunable optical receiver (for individual use) 31-1, and after photo-electric conversion, it is similarly transferred to the ONU PON reception block 32.

The ONU PON reception block 32 performs decomposition of a PON frame and upper layer processing, and transfers signals as Ethernet frames to desired Ethernet PHYs 33-1 to 33-L. Especially, in a preferred embodiment, the IP TV system 5 to receive the IP broadcast is connected to the specific Ethernet PHY 33, and the broadcast signal is transferred to this IP TV system. Besides, data of Internet communication is transferred to, for example, the Ethernet PHY 33 to which the IP system 4 is connected.

With respect to the transmission to the OLT 1, first, signals incoming from the Ethernet PHYs 33-1 to 33-L are inputted to the ONU PON transmission block 34. After the signals are assembled into a PON frame by the ONU PON transmission block 34, they are subjected to electro-photo conversion with the light of the individual use downstream wavelength set by the tunable optical transmitter (for individual use) 36, and then, they are transmitted to the optical fiber 6 through the wavelength multiplexing separation block 30.

Figure 4:
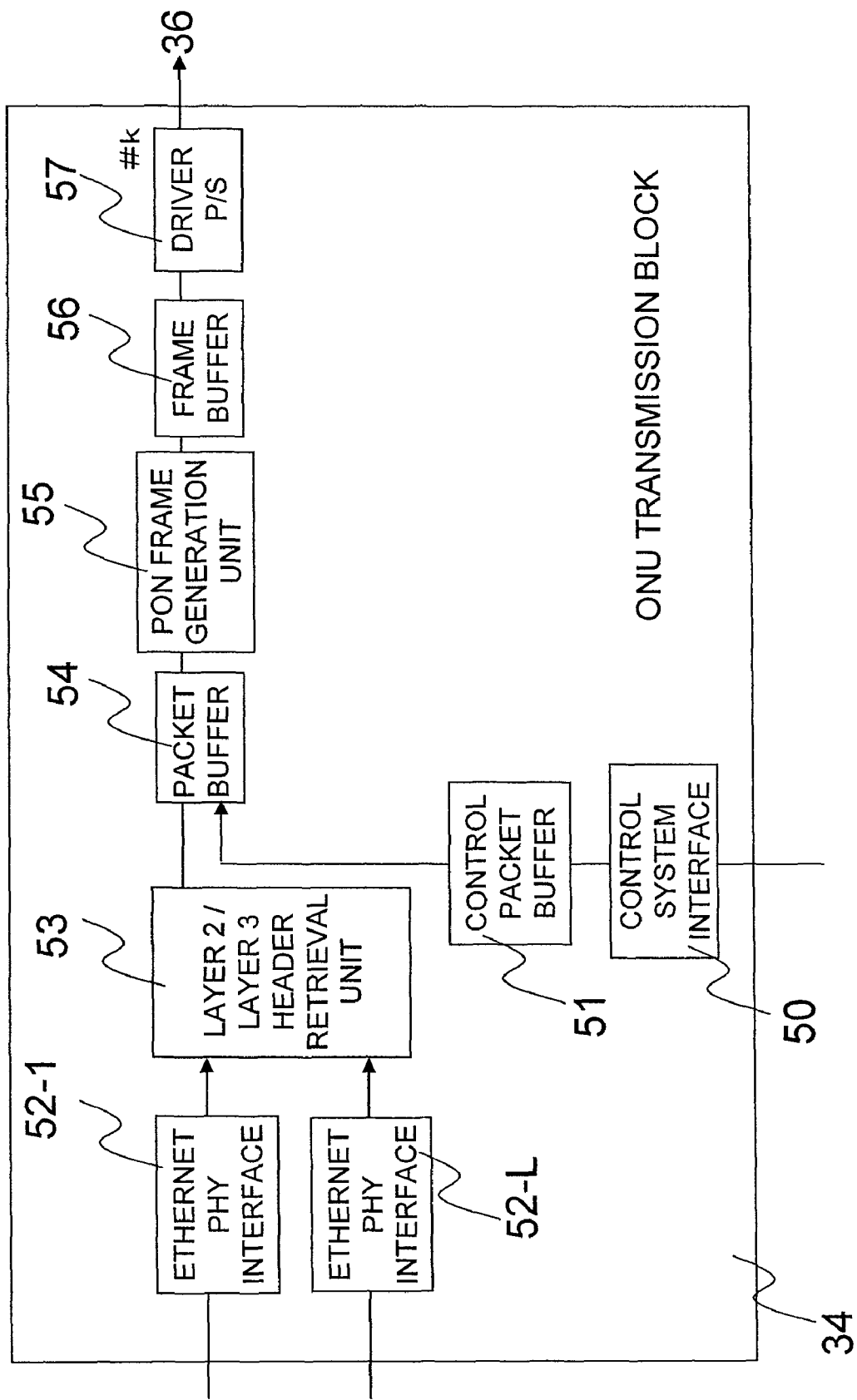
FIG. 4 shows a structural example of an ONU transmission block of the invention.

FIG. 4 shows a structural example of the ONU transmission block 34 according to the embodiment.

In the ONU transmission block 34, the signal incoming from the Ethernet PHY 33 is converted into an inner frame format by an Ethernet PHY interface 52, and then, after a desired processing is performed by a layer 2/layer 3 header retrieval 53, the signal is stored in a packet buffer 54. A control signal transmitted from the MPU 39 is stored in a control packet buffer 51 through a control system interface 50, and is further stored in the packet buffer 54. A packet stored in the packet buffer 54 is sequentially converted into a PON frame by a PON frame generation unit 55 in accordance with a desired algorithm, and is transmitted to the tunable optical transmitter (for individual use) 36 through a frame buffer 56 and a driver P/S 57.

Figure 5:
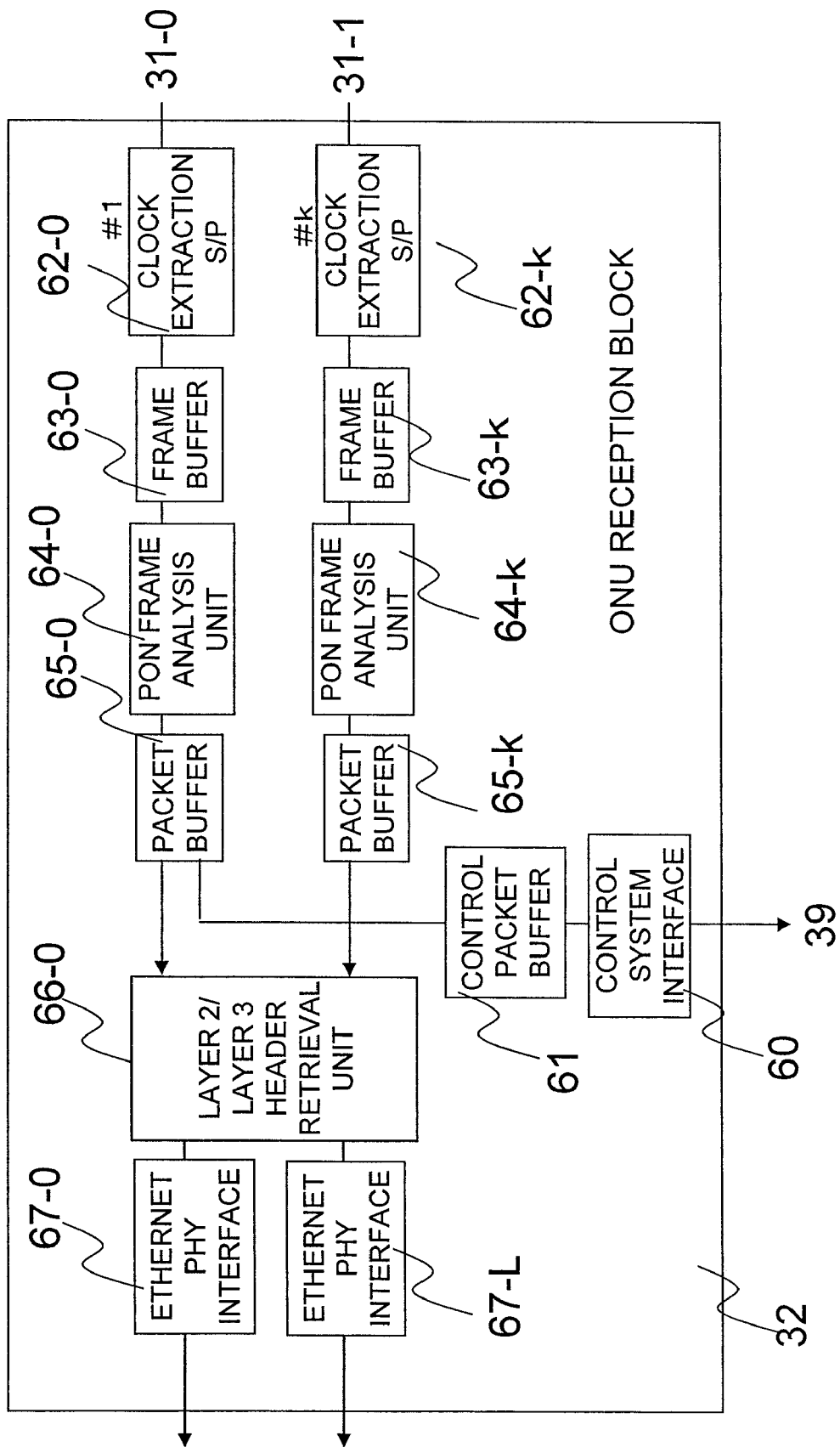
FIG. 5 shows a structural example of an ONU reception block of the invention.

FIG. 5 shows a structural example of the ONU reception block 32 according to the embodiment.

The signal received by the tunable optical receiver (for common use) 31-0 is subjected to frame synchronization and seri-para processing (serial-parallel processing) by a clock extraction S/P 62-0, and then is stored in a frame buffer 63-0. Then, the signal is subjected to decomposition of a PON frame and packet assembly by the PON-frame analysis 64-0 and is stored in a packet buffer 65-0. Similarly, the signal received by the tunable optical receiver (for individual use) 31-1 is subjected to the frame synchronization and seri-para processing by a clock extraction S/P 62-1, and then is stored in a frame buffer 63-1. Then, the signal is subjected to decomposition of a PON frame and packet assembly by a PON frame analysis 64-1 and is stored in a packet buffer 65-1.

A layer 2/layer 3 header retrieval unit 66-0 receives packets from the packet buffers 65-0 and 65-1 in accordance with a desired algorithm, performs header retrieval of the layer 2 and layer 3, and transmits the packets through a desired Ethernet PHY interface 67 to the Ethernet PHY 33. Especially, in a preferred embodiment, the IP TV system 5 to receive the IP broadcast is connected to the specific Ethernet PHY 33, and the broadcast signal is transferred to this IP TV system. Further, with respect to the control signal, the signal is transferred from the packet buffer 65-0 to the MPU 39 through a control packet buffer 61 and a control system interface 60.

Figure 6:
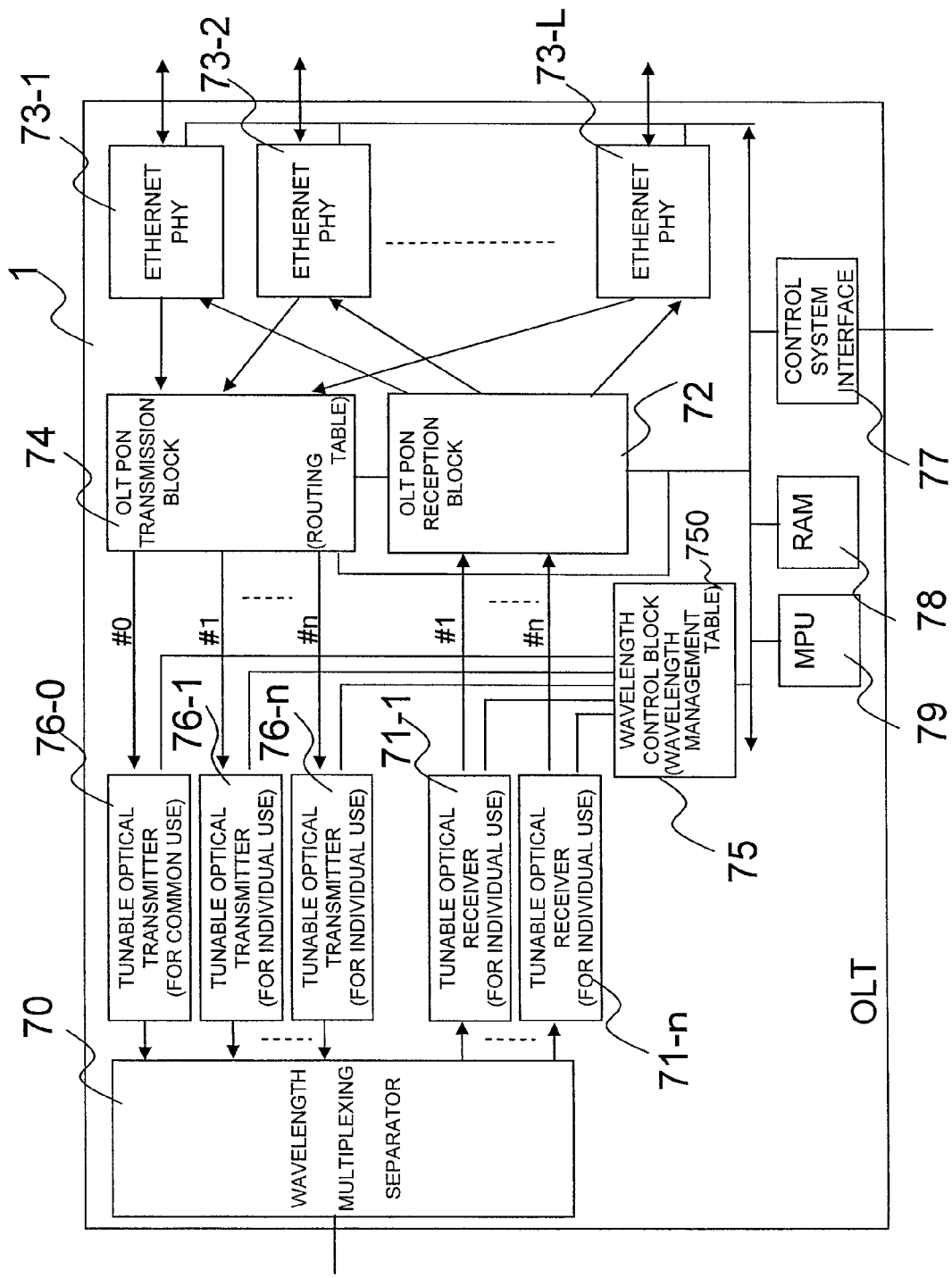
FIG. 6 shows a structural example of an OLT in the first embodiment.

FIG. 6 shows a structural example of the OLT 1 constituting the optical access system according to the embodiment.

The OLT 1 includes, for example, a wavelength multiplexing separation function 70, plural tunable optical receivers (first receivers) 71-1 to 71-n, plural tunable optical transmitters (first transmitters) 76-0 to 76-n, an OLT PON reception block 72, Ethernet PHYs 73-1 to 73-L, an OLT PON transmission block 74, a control system interface 77, a RAM 78, an MPU 79, and a wavelength control block 75.

The OLT 1 has, with respect to the downstream, a function of transmitting the common use downstream wavelength 8 to be transmitted from the OLT 1 and the signal of the individual use downstream wavelength for each ONU 2, and has, with respect to the upstream, a function of receiving the individual use upstream wavelength 10 transmitted from the ONU 2 to the OLT 1. The OLT 1 includes a function (first control unit), including the MPU 79 and the RAM 78, of controlling the OLT 1, sets the common use downstream wavelength 8 to be received by each ONU 2, the individual use downstream wavelength for the ONU 2, and the transmitted individual use upstream wavelength 10 into the wavelength control block 75, and sets the wavelengths into the tunable optical receivers 71-1 to 71-n and the tunable optical receivers 76-0 to 76-n.

With respect to the reception from the ONU 2, the incoming optical signal is separated by the wavelength multiplexing separation function 70. The individual use upstream wavelength is received by the tunable optical receivers (for individual use) 71-1 to 71-n, and after photo-electric conversion, it is transferred to the OLT PON reception block 72. At this time, in the case where each wavelength is determined, instead of the tunable optical receiver 71, an optical receiver for specific wavelength reception may be used. The OLT PON reception block 72 performs decomposition of PON frames and upper layer processing, and transfers signals as Ethernet frames to the desired Ethernet PHYs 73-1 to 73-L.

With respect to the transmission to the ONU 2, incoming signals from the Ethernet PHY 73-1 to 73-L are inputted to the OLT PON transmission block 74. The OLT PON transmission block 74 classifies the signals into a packet for multiple address and a packet for individual ONU, and after assembly into a PON frame is performed, the frame for multiple address (broadcast) to each ONU 2 is sent to the common tunable optical transmitter (for common use) 76-0, and the frame for the specific ONU 2 is sent to the tunable optical transmitters (for individual use) 76-1 to 76-n. After the frames are subjected to the electro-photo conversion by the respective transmitters 76-0 to 76-n, they are transmitted to the optical fiber 7 through the wavelength multiplexing separation block 70. At this time, in the case where each wavelength is determined, instead of the tunable optical transmitter 76, an optical transmitter for specific wavelength transmission may be used.

Figure 7:
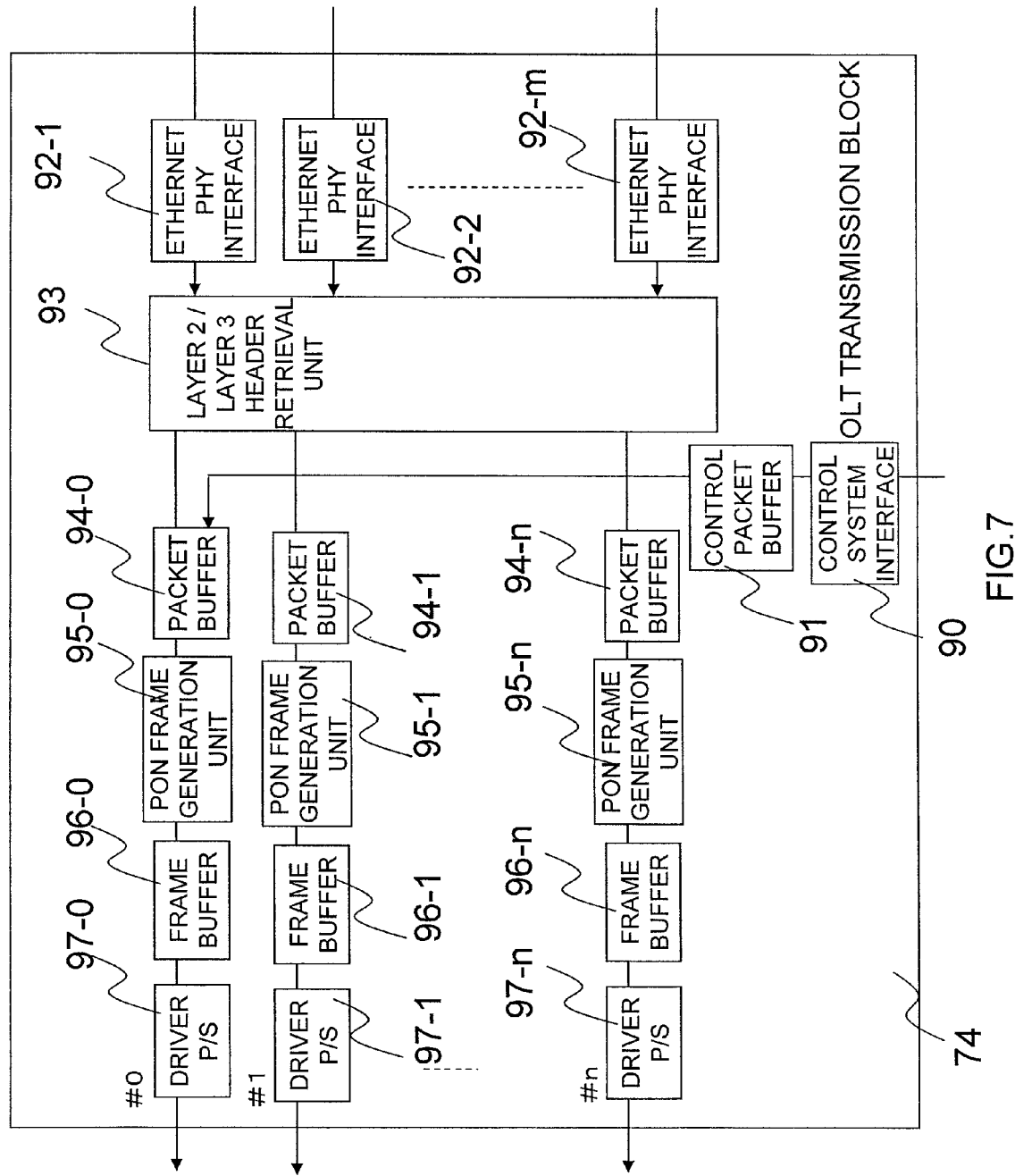
FIG. 7 shows a structural example of an OLT transmission block of the invention.

FIG. 7 shows a structural example of the OLT transmission block 74 according to the embodiment.

In the OLT transmission block 74, after a signal incoming from the Ethernet PHY 73 is converted into an inner frame format by an Ethernet PHY interface 92, it is subjected to a desired processing by a layer 2/layer 3 header retrieval 93, and then is stored in a packet buffer 94. For example, data for common use, such as IP broadcast, is stored in a packet buffer 94-0, and individual data for the respective ONUs are stored in packet buffers 94-1 to 94-n.

Besides, a control signal transmitted from the MPU 79 is stored in a control packet buffer 91 through a control system interface 90, and is further stored in the packet buffer 94-0. The packet stored in the packet buffer 94 is sequentially converted into a PON frame by a PON frame generation unit 95 in accordance with a desired algorithm, and is transmitted to the tunable optical transmitter (for common use) 76-0 and the tunable optical transmitters (for individual use) 76-1 to 76-n through a frame buffer 96 and a driver P/S 97.

Figure 8:
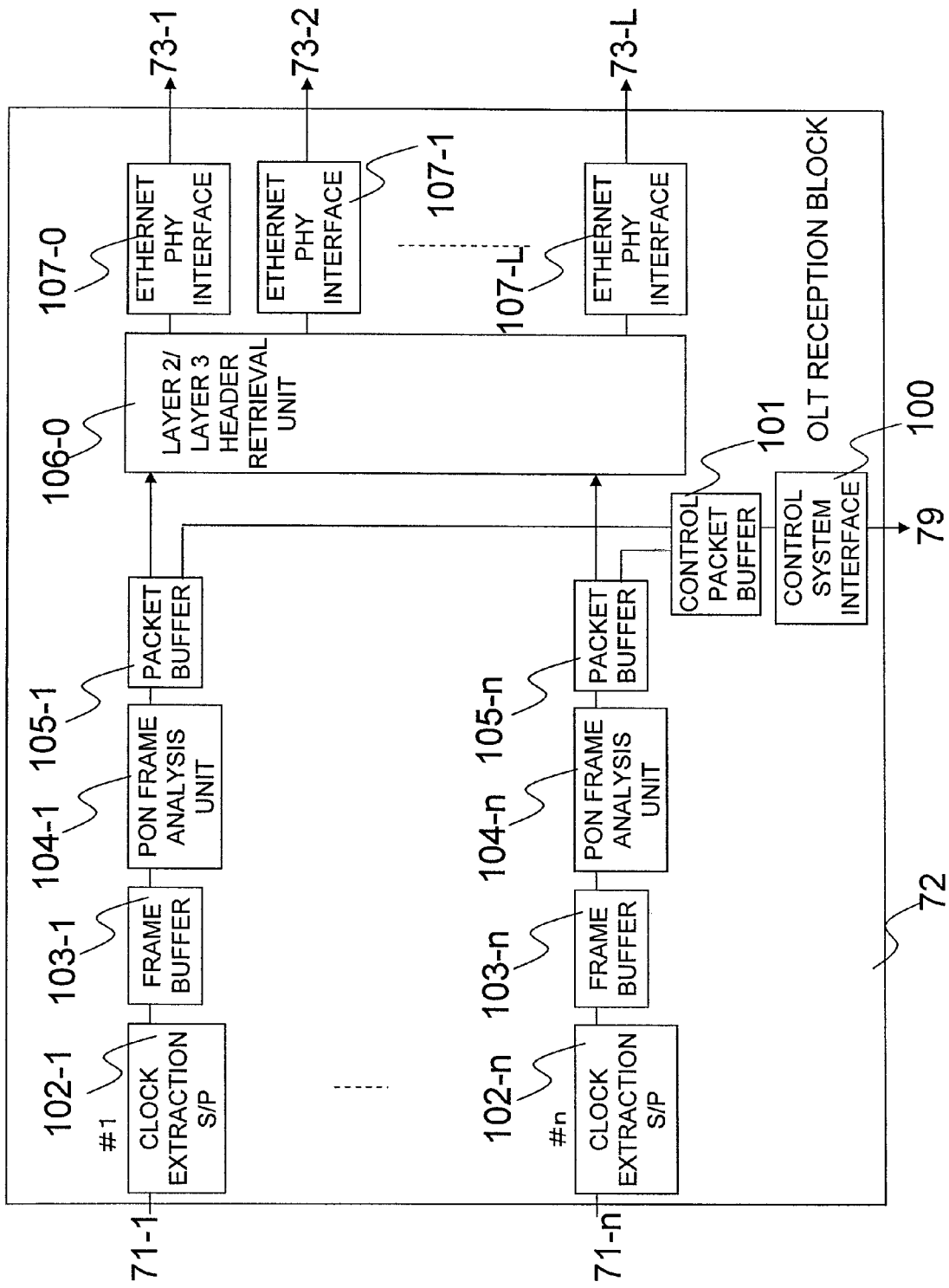
FIG. 8 shows a structural example of an OLT reception block of the invention.

FIG. 8 shows a structural example of the ONU reception block 72 according to the embodiment.

Signals received by the tunable optical receivers (for individual use) 71-1 to 71-n are subjected to frame synchronization and seri-para processing by clock extraction S/P 102-1 to 102-n, and then are stored in frame buffers 103-1 to 103-n. The signals are subjected to decomposition of a PON frame and packet assembly by PON frame analysis units 104-1 to 104-n, and are stored in packet buffers 105-1 to 105-n. A layer 2/layer 3 header retrieval unit 106 receives packets from the packet buffers 105-1 to 105-n in accordance with a desired algorithm, performs header retrieval of layer 2 and layer 3, and transmits the packets from desired Ethernet PHY interfaces 107-0 to 107-m to the Ethernet PHY 73. Further, with respect to the control signal, the signal is transferred from the packet buffers 105-1 to 105-n through a control packet buffer 101 and a control system interface 100 to the MPU 79.

FIG. 10 shows a table structural example of a wavelength management table.

A wavelength management table 750 is provided in, for example, the wavelength control block 75 of the OLT 1, and as shown in the drawing, it can be provided for each of the upstream and the downstream. The wavelength management table 750 stores a wavelength number, an ONU number corresponding thereto, and an ONU individual number. In the case where a new ONU 2 is connected, the OLT 1 refers to the wavelength management table 750 to assign an unassigned wavelength, and registers an ONU number and an ONU individual number into the table correspondingly to the assigned wavelength number. With respect to an unassigned wavelength, suitable information may be stored, for example, the ONU number of the table is made "non-assign".

Also in the case where an ONU is removed, the ONU number and the ONU individual number are deleted from the table, so that the assign relation between the ONU and the wavelength is held.

FIG. 11 shows an OLT routing table held in the inside of the OLT transmission block 74.

This table stores a relation among a VLAN ID, an IP address, objective output path information (correspond to the ONU 2) and a downstream wavelength number. At the time of reception of a packet, for example, the OLT PON transmission block 74 retrieves the content of the table, determines the objective output path and the downstream wavelength number, and outputs the packet to the tunable optical transmitter 76 corresponding to the desired path. Incidentally, this table can be stored in a suitable storage area. In the example of FIG. 11, VLAN ID "A" is, for example, an ID of IP broadcast, and VLAN ID "B" is, for example, one of IDs of individual data communication. Besides, IP address "a.b.c.d" is a destination address of the IP broadcast, and "c.d.e.f" and "e.f.g.h" indicate IP addresses of the ONUs. The output path is previously determined correspondingly to the VLAN ID and the IP address. Incidentally, the downstream wavelength number for the IP broadcast (here, "0") may be previously stored.

Figure 12:
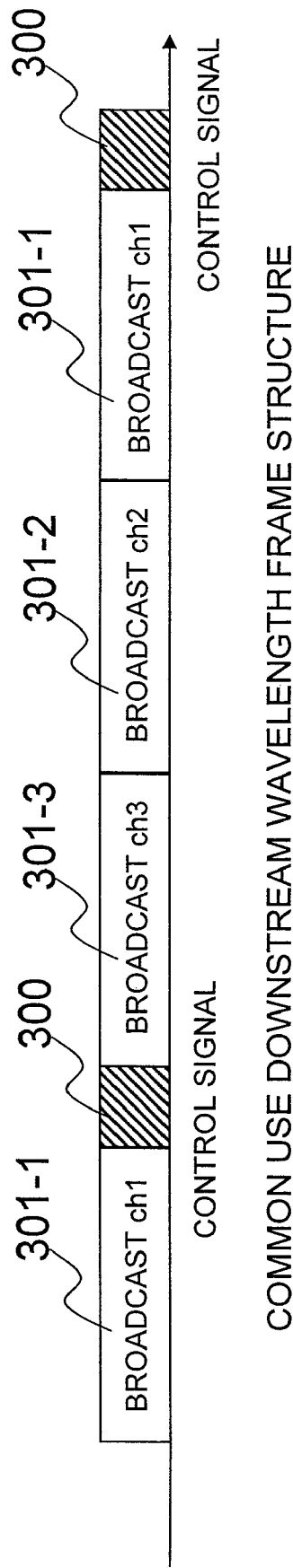
FIG. 12 is an explanatory view of a use method of a common use downstream wavelength shared by broadcast and control.

FIG. 12 is an explanatory view of a use method of the common use downstream wavelength shared by the broadcast and the control.

Since the common use downstream wavelength is shared by the broadcast and the control, it is used in time division. The frame transmission time for control and the frame transmission time of each broadcast channel are divided and are transmitted, so that the wavelength can be shared. For example, a system can be used in which the frame is periodically assigned to the control channel, so that the band for the control is secured without fail.

Figure 9:
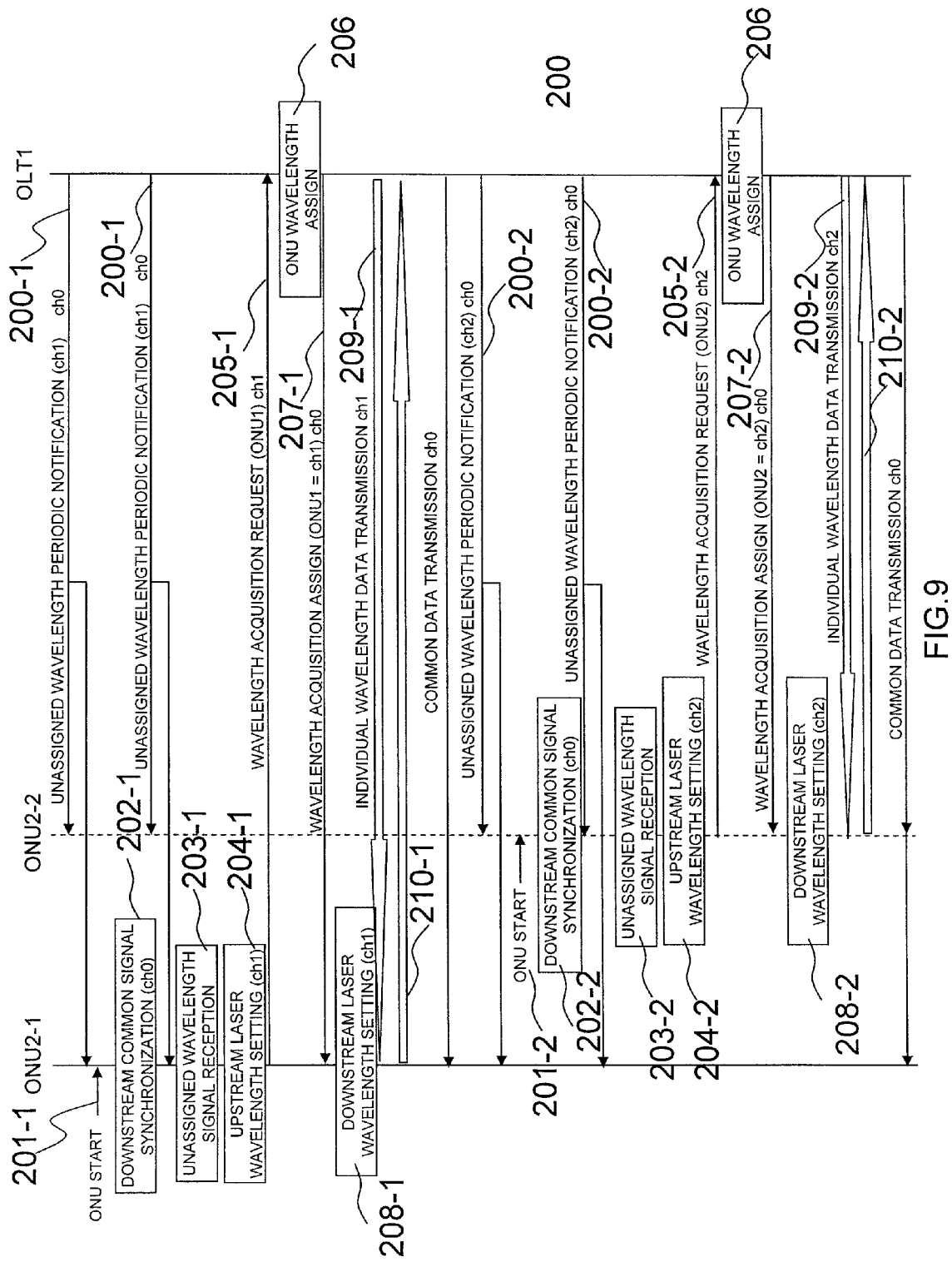
FIG. 9 is a sequence view of transmission-reception wavelength assignment of the invention.

FIG. 9 is a sequence view showing a wavelength assignment system.

The OLT 1 (for example, the MPU 79) refers to the wavelength management table 750 of the wavelength control block 75 and determines an unassigned wavelength. Here, it is assumed that for example, downstream wavelength number "1" and upstream wavelength number "1" (they are collectively called ch1) are unassigned. Incidentally, in the case where there are plural unassigned wavelengths, a suitable one may be selected, for example, one located at the upper level of the table is selected. The OLT 1 uses the previously set common use downstream wavelength (for example, downstream wavelength number "0", ch0) 8, and periodically transmits an unassigned wavelength periodic notification (control message) including the determined unassigned wavelength information (ch1) to the ONU 2 (200-1). The notification is branched by the splitter 3 and reaches each of the ONUS 2. Incidentally, in the case where the upstream wavelength and the downstream wavelength correspond to each other, wavelength information of one of them may be transmitted. Besides, the downstream wavelength information may be transmitted in a later processing. For example, the downstream wavelength information may be transmitted at the time of transmission of an after-mentioned wavelength acquisition assign signal (207-1).

When the ONU 2-1 starts (201-1), known downstream common signal synchronization is performed (202-1). For example, the ONU 2-1 (for example, the wavelength control block 35) sets the tunable optical receiver (for common use) 31-0 to the previously set common use downstream wavelength (ch0).

The ONU 2-1 receives the unassigned wavelength periodic notification sent by the downstream common wavelength 8 (200-1), and synchronously sets the upstream laser wavelength in the notified channel (204-1). For example, the ONU 2-1 (for example, the wavelength control block 35) sets the wavelength of the tunable optical transmitter (for individual use) 36 in accordance with the upstream unassigned wavelength information (in this example, ch1) included in the unassigned wavelength period notification.

The ONU 2-1 (for example, the MPU 39) transmits a wavelength acquisition request (205-1). The wavelength acquisition request includes, for example, the ONU individual number of the ONU 2-1. Incidentally, the wavelength acquisition request is transmitted through the tunable optical transmitter 36 by the upstream wavelength (ch1) set in the foregoing processing 204-1.

When receiving the wavelength acquisition request, the OLT 1 (for example, the MPU 79) determines the ONU wavelength assign (206). For example, correspondingly to the wavelength number of the received wavelength, the ONU individual number and the ONU number included in the wavelength acquisition request are stored in the wavelength management table 750. In this example, the ONU number "2" of the ONU 2-1 and the ONU individual number "A. B. C. D" of the ONU 2-1 are stored in the upstream wavelength management table 750 correspondingly to the upstream wavelength number "1". Besides, the ONUI number "2" and the ONU individual number "A. B. C. D" are stored in the downstream wavelength management table 750 correspondingly to the downstream wavelength number. Incidentally, the ONU number is an identifier to identify the ONU, and may be assigned at a suitable timing. Further, the OLT 1 stores the downstream wavelength number in the routing table (downstream). For example, the output path is retrieved based on the ONU number, and the downstream wavelength number is stored correspondingly to the output path information. The OLT 1 transmits the wavelength acquisition assign signal to the ONU 1 (207-1). Incidentally, the OLT 1 transmits the wavelength acquisition assign signal by, for example, the common use downstream wavelength (ch0).

The ONU 1 receives the wavelength acquisition assign signal, and performs the downstream laser wavelength setting (208-1). For example, the wavelength control block 35 sets the wavelength of the tunable optical receiver (for individual use) 31-1 in, for example, ch1.

By this procedure, the ONU 2 acquires the individual use downstream wavelength information and the individual use upstream wavelength information, and can start the communication between the OLT 1 and the ONU 2.

When receiving, for example, the data of the IP broadcast from the IP network 20, the OLT 1 refers to the routing table based on the VLAN ID and the destination IP address included in the data and acquires the corresponding output path information and/or downstream wavelength number. Here, since the downstream wavelength number "0" is stored for the VLAN ID "A" of the common signal such as the IP broadcast, the OLT transmits the data of the received IP broadcast to each ONU 2 by the tunable optical transmitter (for common use) 76-0 corresponding to the downstream wavelength number "0".

On the other hand, when receiving, for example, the individual data of each ONU from the IP network 20, the OLT 1 similarly refers to the routing table based on the VLAN ID and the destination IP address included in the data, and acquires the corresponding output path information and/or the downstream wavelength number. For example, the downstream wavelength number "1" is acquired for the VLAN ID "B" of the individual data and the IP address "c.d.e.f". The OLT 1 transmits the received data to the ONU 2 by the tunable optical transmitter (for individual use) 76-1 corresponding to the downstream wavelength number "1".

In accordance with the set wavelength, the ONU receives the data of the IP broadcast by the tunable optical receiver (for common use) 31-0, and receives the individual data such as the Internet by the tunable optical receiver (for individual use) 31-1.

Incidentally, the same applies to the ONU 2-2. However, in unassigned wavelength periodic notification here, for example, a downstream unassigned wavelength number "2" and an upstream unassigned wavelength number "2" (they are collectively called ch2) are transmitted.

2. Second Embodiment

Figure 13:
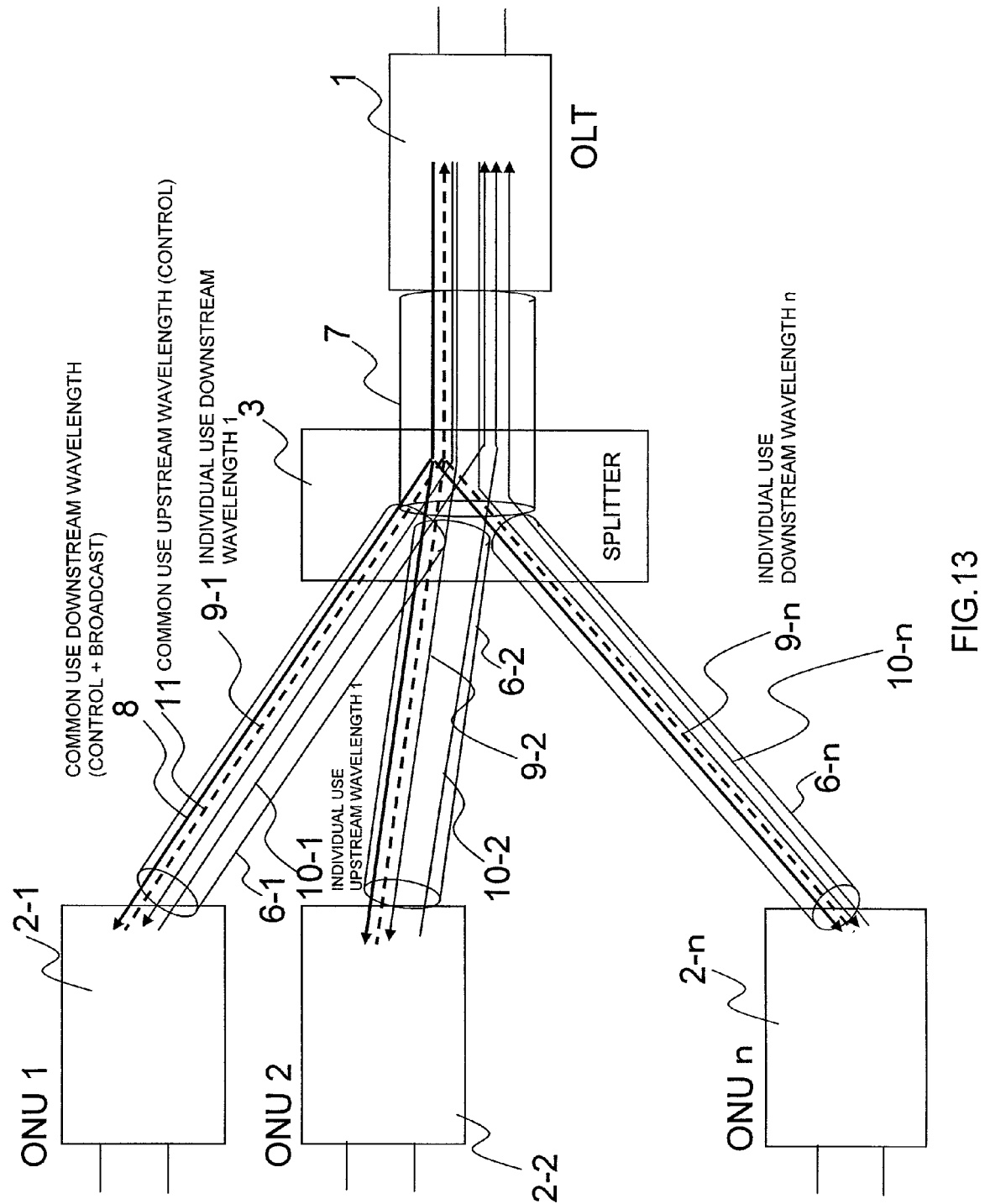
FIG. 13 is an explanatory view of optical wavelength assignment of an optical access system in a second embodiment.

FIG. 13 is an explanatory view of optical wavelength assignment in an optical access system according to this embodiment.

This embodiment shows an example in which a common control wavelength (third wavelength) 11 is provided also in upstream wavelengths. Each of ONUS 2 and an OLT 1 are connected to each other through a main line optical fiber 7, a splitter 3, and a branch line optical fiber 6-1. A common use downstream wavelength 8, the common use upstream wavelength 11, n individual use downstream wavelengths 9 and an individual use upstream wavelength 10 are multiplexed together into the main line optical fiber 7 and the branch line optical fiber 6. The common use downstream wavelength 8 transmitted from the OLT 1 is received by each of the ONUS 2. The individual use downstream wavelength 9 transmitted from the OLT 1 is received by a specific ONU (for example, wavelength 9-1 is received by ONU 2-1). With respect to the upstream wavelengths, the common use upstream wavelength 11 is held and is shared for transmissions of control signals from the respective ONUS to the OLT. The individual use upstream wavelength 10 is transmitted from each of the ONUS (for example, wavelength 10-1 is transmitted from ONU 2-1) and is received by the OLT 1.

Figure 14:
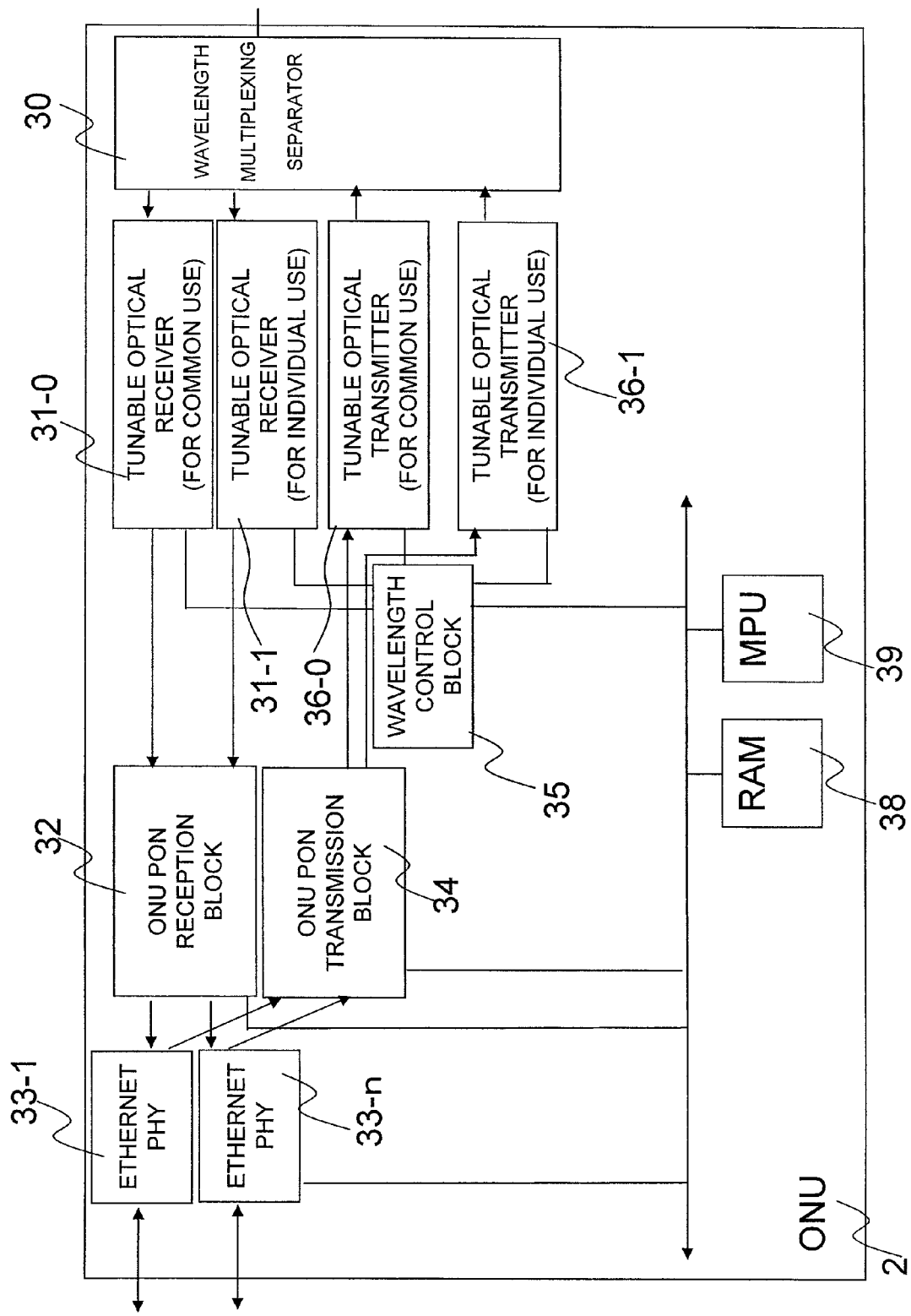
FIG. 14 shows a structural example of an ONU 2 constituting the optical access system in the second embodiment.

FIG. 14 shows a structural example of the ONU 2 constituting the optical access system according to this embodiment.

The ONU 2 further includes a tunable optical transmitter 36-0 for common wavelength. The ONU 2 has, with respect to the downstream, a function of receiving signals of the common use downstream wavelength 8 transmitted from the OLT 1 and the individual use downstream wavelength 9 for the ONU 2, and has, with respect to the upstream, a function of transmitting the common use upstream wavelength 11 transmitted from the ONU 2 to the OLT 1 and the individual use upstream wavelength 10.

The ONU 2 has a function to control the ONU 2, which is formed of an MPU 39 and a RAM 38, sets the common use downstream wavelength 8 received by each ONU 2, the individual use downstream wavelength 9 for the ONU 2, the individual use upstream wavelength 10 to be transmitted, and the common use upstream wavelength 11 into a wavelength control block 35, and sets wavelengths into tunable optical receivers 31-0 and 31-1 and tunable optical transmitters 36-0 and 36-1.

The reception from the OLT 1 is similar to the first embodiment. For example, an incoming optical signal is separated by a wavelength multiplexing separation function 30. The common use downstream wavelength 8 is received by the tunable optical receiver (for common use) 31-0, and after photo-electric conversion, it is transferred to an ONU PON reception block 32. At this time, in the case where the common use downstream wavelength 8 is previously determined, instead of the tunable optical receiver (for common use) 31-0, an optical receiver for specific wavelength reception may be used. Besides, the individual use downstream wavelength is received by the tunable optical receiver (for individual use) 31-1, and after photo-electric conversion, it is similarly transferred to the ONU PON reception block 32. In the ONU PON reception block 32, the decomposition of a PON frame and upper layer processing are performed, and signals are respectively transferred as Ethernet frames to desired Ethernet PHYs 33-1 to 33-L. Especially, in a preferred embodiment, an IP TV system 5 to receive IP broadcast is connected to a specific Ethernet PHY 33, and the broadcast signal is transferred to this IP TV system.

With respect to transmission to the OLT 1, signals incoming from the Ethernet PHYs 33-1 to 33-L are inputted to ONU PON transmission block, and after being assembled into PON frames, the signals are subjected to electro-photo conversion by the tunable optical transmitter (for individual use) 36-1, and then are transmitted to the optical fiber 6 through the wavelength multiplexing separation function 30. Besides, a control signal is transmitted from the MPU 39 to the ONU PON transmission block 34, and is transmitted to the OLT 1 by the tunable optical transmitter 36-0.

Figure 15:
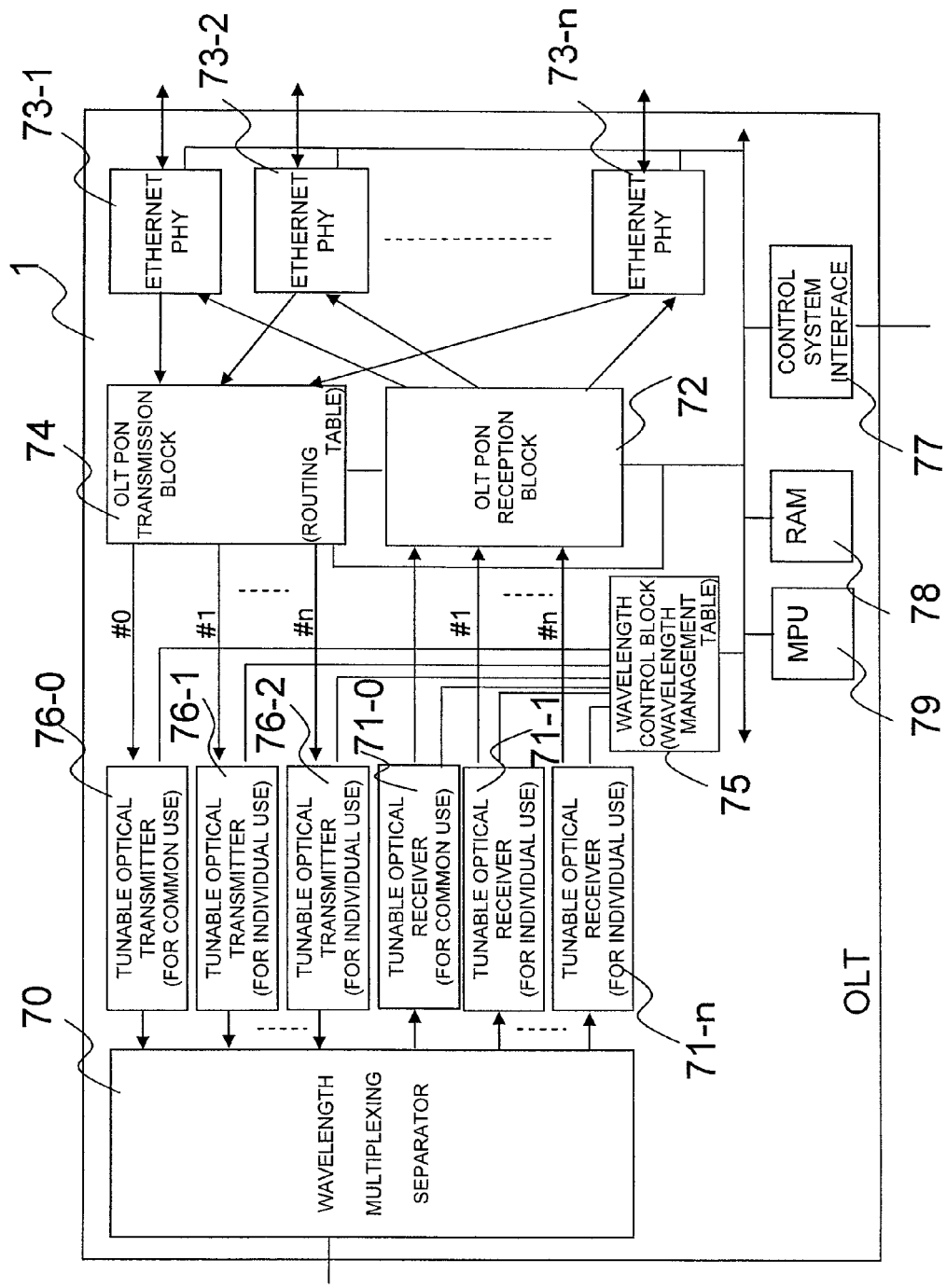
FIG. 15 shows a structural example of an OLT 1 constituting the optical access system in the second embodiment.

FIG. 15 shows a structural example of the OLT 1 constituting the optical access system according to this embodiment.

The OLT 1 further includes a tunable optical receiver 71-0 for common wavelength. The OLT 1 has, with respect to the downstream, a function of transmitting the common use downstream wavelength 8 transmitted from the OLT 1 and the individual use downstream wavelength 9 for the ONU 2, and has, with respect to the upstream, a function of receiving the common use upstream wavelength 11 transmitted from each ONU 2 to the OLT 1 and the individual use upstream wavelength 10 transmitted from each ONU. The OLT 1 has a function to control the OLT 1, which includes an MPU 79 and a RAM 78, sets the common use downstream wavelength 8 received by each ONU 2, the individual use downstream wavelength 9 for the ONU 2, the common use upstream wavelength 11 to be transmitted, and the individual use upstream wavelength 10 into a wavelength control block 75, and sets wavelengths into tunable optical receivers 71-0 to 71-n and tunable optical transmitters 76-0 to 76-n.

With respect to the reception from the ONU 2, an incoming optical signal is separated by a wavelength multiplexing separation function 70. The individual use upstream wavelength is received by the tunable optical receiver (for common use) 71-0 and the tunable optical receivers (for individual use) 71-1 to 71-n, and after photo-electric conversion, it is transferred to an ONU PON reception block 72. At this time, in the case where each wavelength is determined, instead of the tunable optical receiver 71, an optical receiver for specific wavelength reception may be used. In the OLT PON reception block 72, the decomposition of a PON frame and upper layer processing are performed, and signals are respectively transferred as Ethernet frames to desired Ethernet PHYs 73-1 to 73-L.

The transmission to the ONU 2 is similar to the first embodiment. For example, signals incoming from the Ethernet PHYs 73-1 to 73-L are inputted to the OLT PON transmission block, and are classified into a packet for multiple address and a packet for individual ONU, and then, after assembly into PON frames is performed, the frame for multiple-address (broadcast) to each ONU 2 is sent to the common tunable optical transmitter (for common use) 76-0, and the frame to the specific ONU 2 is sent to the tunable optical transmitters (for individual use) 76-1 to 76-n, and after the electro-photo conversion is performed, they are transmitted to the optical fiber 7 through the wavelength multiplexing separation block 30. At this time, in the case where each wavelength is determined, instead of the tunable optical transmitter 76, an optical transmitter for specific wavelength transmission may be used.

The other structure and processing are the same as those of the first embodiment.

3. Third Embodiment

Figure 16:
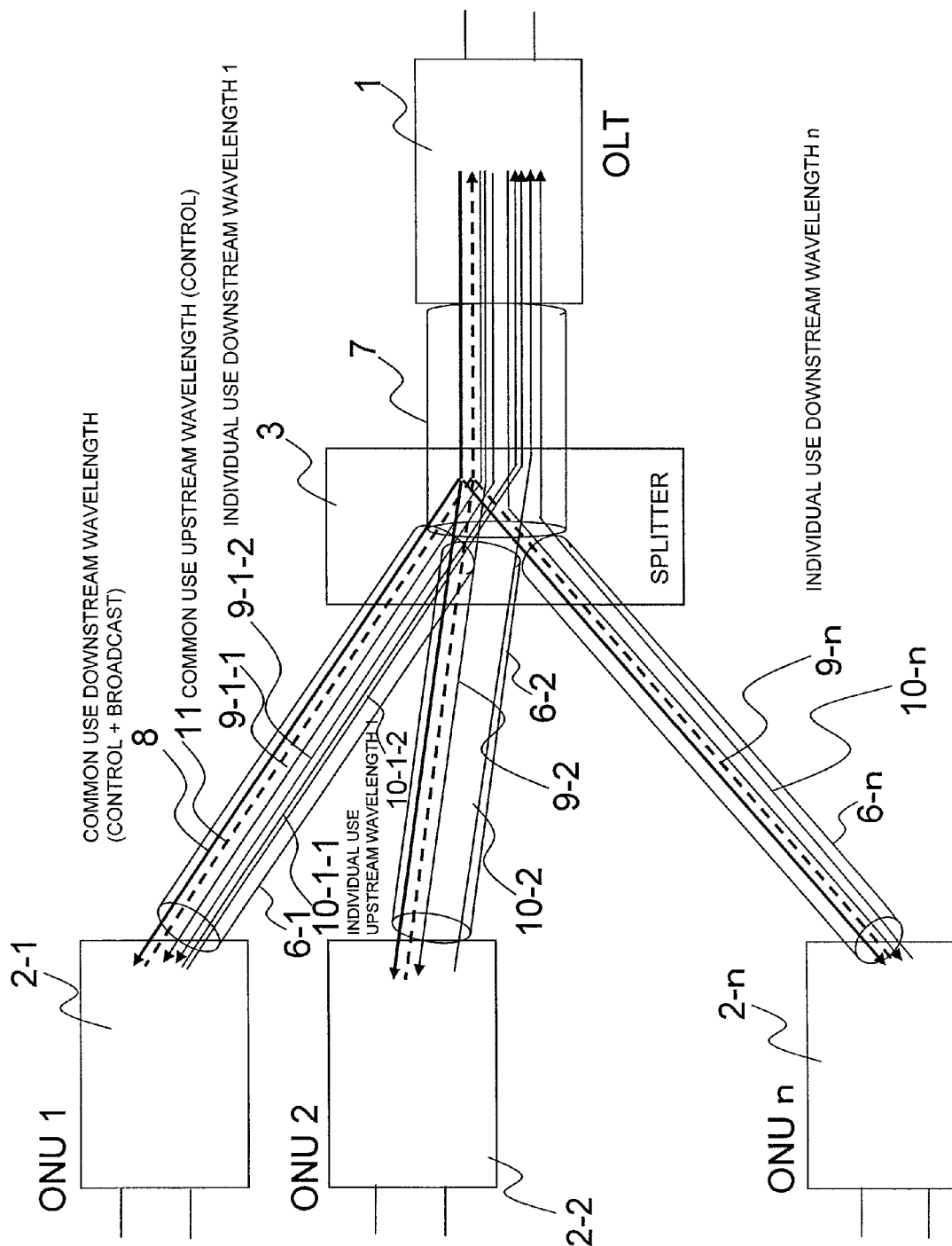
FIG. 16 shows an example of optical wavelength assignment of an optical access system in a third embodiment.

FIG. 16 shows an example of optical wavelength assignment in an optical access system according to this embodiment.

This embodiment is an example in which plural individual downstream wavelengths 9 are assigned to one ONU 2. Each of ONUS 2 and an OLT 1 are connected to each other through a main line optical fiber 7, a splitter 3, and a branch line optical fiber 6-1. A common use downstream wavelength 8, n individual use downstream wavelengths 9, and an individual use upstream wavelength 10 are multiplexed together into the main line optical fiber 7 and the branch line optical fiber 6. The common use downstream wavelength 8 transmitted from the OLT 1 is received by each of the ONUS 2. The plural individual use downstream wavelengths 9 transmitted from the OLT 1 are received by a specific ONU. For example, plural wavelengths 9-1-1 and 9-1-2 are assigned to the ONU 2-1. With respect to the upstream wavelength, the common use upstream wavelength 11 is held and may be shared for transmissions of control signals from the respective ONUS to the OLT. The individual use upstream wavelength 10 is transmitted from each ONU (for example, the wavelength 10-1 is transmitted from the ONU 2-1), and is received in the OLT 1.

Figure 17:
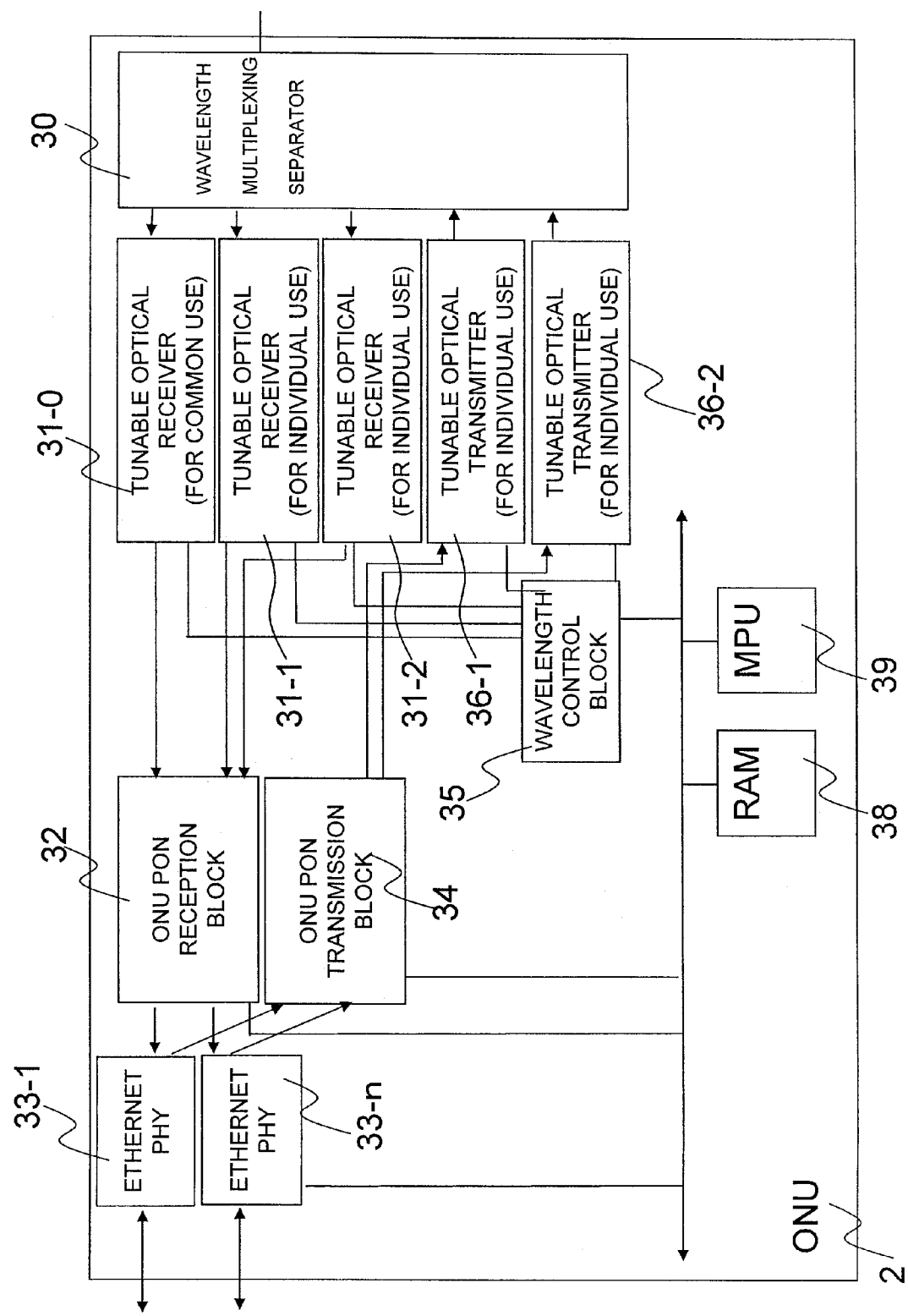
FIG. 17 is a structural view of an ONU in the third embodiment.

FIG. 17 is a structural view of the ONU according to this embodiment. The ONU 2 includes plural individual tunable optical receivers 31 and plural tunable optical transmitters 36.

The other structure and processing are the same as those of the first embodiment. Further, this embodiment may be combined with the structure of the second embodiment.

The invention can be used for, for example, an access network using an optical technique, and an optical access system using a PON system.

What is claimed is:

1. A passive optical network system comprising an optical line terminal, an optical splitter, and a plurality of optical network units connected to the optical line terminal through an optical fiber and the optical splitter, and in which the optical line terminal and the optical network units communicate with each other by wavelength division multiplexing,
wherein the optical line terminal:
transmits a control message including unassigned wavelength information by a first wavelength to be received in common by the plurality of optical network units; and
transmits data to each of the optical network units by second wavelengths assigned to the optical network units and being different each other and different from the first wavelength,
wherein the optical network units receive the control message transmitted by the first wavelength and receive the data transmitted by second wavelength assigned to own optical network unit, and when a new optical network unit adds to the passive optical network system, the new optical network unit sets at least one second wavelength in accordance with the unassigned wavelength information included in the control message transmitted from the optical line terminal.

2. The passive optical network system according to claim 1, wherein
the optical line terminal
assigns the first wavelength to the broadcast communication to the respective optical network units, and
assigns one or a plurality of second wavelengths to each of the optical network units to perform point-to-point communication between the optical line terminal and each of the optical network units.

3. The passive optical network system according to claim 1, wherein the optical line terminal
transmits broadcast communication data and the control message by the first wavelength, and
performs point-to-point communication with each of the optical network units by the second wavelength.

4. The passive optical network system according to claim 1, wherein the optical line terminal
stores, for each of identifiers of the optical network units, second wavelength information assigned for communication with each of the optical network units, and
transmits the control message for assigning the second wavelength to the optical network unit by the first wavelength,
wherein
the second wavelengths each of which are different wavelength are assigned to the optical network units respectively.

5. The passive optical network system according to claim 1, wherein
a control message from the optical network units to the optical line terminal is transmitted/received by a third wavelength.

6. The passive optical network system according to claim 1, wherein the optical line terminal
identifies a first packet for performing the broadcast communication to each of the optical network units, transmits identified first packet of the broadcast communication to the optical network units by using the first wavelength, and
identifies a second packet for performing point-to-point communication and a destination thereof, and uses the second wavelength assigned to the optical network unit of the destination to transmit identified second packet to the optical network unit.

7. The passive optical network system according to claim 1, wherein
the second wavelength includes a downstream wavelength from the optical line terminal to the optical network unit, and an upstream wavelength from the optical network unit to the optical line terminal.

8. The passive optical network system according to claim 1, wherein
broadcast communication data and the control message are transmitted by time division in the first wavelength.

9. The passive optical network system according to claim 8, wherein
a periodical transmission bandwidth for the broadcast communication data are assigned in the first wavelength.

10. An optical line terminal for connecting to a plurality of optical network units through a passive optical network and communicating with the optical network units by wavelength division multiplexing, wherein the optical line terminal
assigns a first wavelength to be received in common by respective optical network units and assigns second wavelengths for communication with each of the optical network units to each of the optical network units among a plurality of wavelengths which are different from the first wavelength,
transmits, by a first wavelength, a control message including unassigned wavelength information which is not assigned to the communication, and
transmits, when a new optical network unit adds to the passive optical network, data to the new optical network unit by second wavelength newly set by the new optical network units in accordance with the unassigned wavelength information included in the control message.

11. The optical line terminal according to claim 10, wherein the optical line terminal
assigns the first wavelength to broadcast communication to each of the optical network units from the optical line terminal, and
assigns one or a plurality of second wavelengths to each of the optical network units to perform point-to-point communication between the optical line terminal and each of the optical network units.

12. The optical line terminal according to claim 11, wherein
the optical line terminal assigns a plurality of second wavelengths for the point-to-point communication to one of the plurality of optical network units.

13. The optical line terminal according to claim 11, wherein the optical line terminal
transmits the broadcast communication data and the control message by the first wavelength,
performs point-to-point communication with each of the optical network units by the second wavelength, and
the second wavelength for the point-to-point communication is assigned to each of the optical network units one by one.

14. The optical line terminal according to claim 10, wherein
the optical line terminal further assigns a third wavelength for receiving the control message from the optical network units.

15. The optical line terminal according to claim 10, wherein the optical line terminal
identifies a first packet for performing broadcast communication with each of the optical network units, transmits identified first packet of the broadcast communication to the optical network units by using the first wavelength, and
identifies a second packet for performing point-to-point communication and a destination thereof, and uses the second wavelength assigned to the optical network unit of the destination to transmit identified second packet to the optical network unit.

16. The optical line terminal according to claim 10, wherein
the second wavelength includes a downstream wavelength from the optical line terminal to the optical network unit, and an upstream wavelength from the optical network unit to the optical line terminal.

17. The optical line terminal according to claim 10, wherein
broadcast communication data and the control message are transmitted by time division in the first wavelength.

18. The optical line terminal according to claim 17, wherein
a periodical transmission bandwidth for the broadcast communication data are assigned in the first wavelength.

19. An optical network unit in a passive optical network system which comprises an optical line terminal, an optical splitter, and optical network units including own optical network unit and other optical network units connected to the optical line terminal through an optical fiber and the optical splitter, and in which the optical line terminal and the optical network units communicate with each other by wavelength division multiplexing, a first wavelength to be received in common by own and other optical network units is determined by the optical line terminal, second wavelengths for communication between the optical line terminal and other optical network units are assigned among a plurality of wavelengths which are different from the first wavelength and, a control message including unassigned wavelength information which is not assigned to communication with other optical network units are transmitted from the optical line terminal by a first wavelength,
wherein
the optical network unit, when the optical network unit newly connected to the optical line terminal,
receives the control message transmitted from the optical line terminal,
sets at least one second wavelength in accordance with the unassigned wavelength information included in the control message,
thereafter, receives the control message from the optical line terminal by the first wavelength and receives data from the optical line terminal by set second wavelength.

20. The optical network unit according to claim 19, wherein
the optical network unit receives a signal for performing broadcast communication with own and other optical network units from the optical line terminal by the first wavelength, and receives a signal for receiving by only own optical network unit by the second wavelength.

21. The optical network unit according to claim 19, wherein the optical network unit
receives broadcast communication data and the control message by the first wavelength, and
performs point-to-point communication with the optical line terminal by the second wavelength,
wherein at least one second wavelength for the point-to-point communication is assigned.

22. The optical network unit according to claim 19, wherein the optical network unit
receives broadcast communication data and the control message by the first wavelength, and
performs point-to-point communication with the optical line terminal by a plurality of second wavelengths,
wherein the plurality of second wavelengths for the point-to-point communication are assigned.

23. The optical network unit according to claim 19, wherein
the optical network unit transmits the control message to the optical line terminal by a third wavelength.

24. The optical network unit according to claim 19, wherein
the optical network unit receives broadcast communication data and the control message transmitted by time division in the first wavelength.

25. The optical network unit according to claim 24, wherein
a periodical transmission bandwidth for the broadcast communication data are assigned in the first wavelength.

* * * * *